United States Patent [19]
Reiffel et al.

[11] Patent Number: 5,251,123
[45] Date of Patent: Oct. 5, 1993

[54] HIGH RESOLUTION SYSTEM FOR SENSING SPATIAL COORDINATES

[75] Inventors: Leonard Reiffel, Chicago; Wayne D. Jung, Skokie; Thomas Rosevear; Thomas Jakobs, both of Chicago, all of Ill.

[73] Assignee: I C Operating, Inc., New York, N.Y.

[21] Appl. No.: 746,285

[22] Filed: Aug. 13, 1991

Related U.S. Application Data

[63] Continuation of Ser. No. 616,732, Nov. 21, 1990, abandoned, which is a continuation of Ser. No. 363,287, Jun. 7, 1989, abandoned, which is a continuation of Ser. No. 110,140, Oct. 19, 1987, abandoned.

[51] Int. Cl.⁵ ...................... G06F 19/64; G05B 19/18; G08C 21/00
[52] U.S. Cl. ................................ 364/167.01; 178/19; 345/179
[58] Field of Search .......................... 364/167.01, 188; 178/18, 19, 87; 340/707, 710

[56] References Cited

U.S. PATENT DOCUMENTS

| | | | |
|---|---|---|---|
| 2,925,467 | 2/1960 | Becker | 178/18 |
| 3,005,050 | 10/1961 | Koenig | 178/20 |
| 3,449,516 | 6/1969 | Cameron et al. | 178/18 |
| 3,466,391 | 9/1969 | Ellis | 178/18 |
| 3,497,617 | 2/1970 | Ellis | 178/19 |
| 3,522,664 | 8/1970 | Lambright et al. | 35/8 |
| 3,530,241 | 9/1970 | Ellis | 178/19 |
| 3,576,356 | 4/1971 | Hyman | 350/156 |
| 3,582,962 | 6/1971 | Mazza | 178/19 |
| 3,588,345 | 6/1971 | Dym | 178/18 |
| 3,590,158 | 6/1971 | Pabst | 178/18 |
| 3,591,718 | 7/1971 | Asano et al. | 178/19 |
| 3,624,293 | 11/1971 | Baxter | 178/18 |

(List continued on next page.)

OTHER PUBLICATIONS

"Linear Current Division and Resistive Areas: Its Application to Computer Graphics," by J. A. Turner and G. J. Ritchie, Spring Joint Computer Conference, May 1970.

"Fast Computer Graphic Data Entry: A New Zero--Crossing Delay Technique," by J. A. Turner and G. J. Ritchie, purportedly from IEEE Conference Publication No. 150: Displays For Man Machine Systems, Jun. 1986.

Primary Examiner—Jerry Smith
Assistant Examiner—Paul Gordon
Attorney, Agent, or Firm—Alan R. Loudermilk

[57] ABSTRACT

An improved high resolution method and apparatus are described for sensing and determining the spatial coordinates of a movable object with respect to a energized conductive surface. The coordinates of the object are precisely measured with respect to a two-dimensional coordinate system independent of the third orthogonal dimension, thereby avoiding significant measurement errors due to variations of the object position in the third orthogonal dimension. The system also ascertains the coordinate position of the object in this third dimension, which can then be utilized as an independent control variable in the system. Further, the system can accommodate a number of energized conductive surfaces over which the object may be positioned and can determine the spatial coordinates of the object with respect to any such surface. In general, the system of the present invention can ascertain the generalized n-tuple position vector of the object with respect to each of a plurality of generalized, energized conductive surfaces. In any of the foregoing forms, the energized conductive surfaces can be transparent. The system described improves the precision and accuracy of the location of the selected point and hence the precision and accuracy of the spatial coordinates calculated by the system for display. The improvement in system performance is the result of innovations in fundamental design concepts utilized throughout the system.

24 Claims, 9 Drawing Sheets

U.S. PATENT DOCUMENTS

| | | | |
|---|---|---|---|
| 3,632,874 | 1/1972 | Malavard | 178/18 |
| 3,670,103 | 6/1972 | Baxter et al. | 178/19 |
| 3,699,439 | 10/1972 | Turner | 178/18 |
| 3,757,322 | 9/1973 | Barkan et al. | 178/18 |
| 3,857,022 | 12/1974 | Rebane et al. | 178/18 |
| 3,885,097 | 5/1975 | Pobgee | 178/18 |
| 3,911,215 | 10/1975 | Hurst et al. | 178/18 |
| 3,921,165 | 11/1975 | Dym | 178/19 |
| 3,958,234 | 5/1976 | Hoo | 178/19 |
| 3,959,585 | 5/1976 | Mattes | 178/18 |
| 3,992,579 | 11/1976 | Dym et al. | 178/18 |
| 4,018,989 | 4/1977 | Synder et al. | 178/19 |
| 4,034,155 | 7/1977 | Muller et al. | 178/19 |
| 4,055,726 | 10/1977 | Turner et al. | 178/18 |
| 4,071,689 | 1/1978 | Talmage et al. | 178/18 |
| 4,081,603 | 3/1978 | Davis et al. | 178/19 |
| 4,087,625 | 5/1978 | Dym et al. | 178/19 |
| 4,088,842 | 5/1978 | Ikedo | 178/19 |
| 4,158,747 | 6/1979 | Muller et al. | 178/19 |
| 4,177,354 | 12/1979 | Matthews | 178/18 |
| 4,198,539 | 4/1980 | Pepper, Jr. | 178/18 |
| 4,214,122 | 7/1980 | Kley | 178/18 |
| 4,302,011 | 11/1981 | Pepper, Jr. | 178/19 |
| 4,346,260 | 8/1982 | Kaufmann | 178/18 |
| 4,435,616 | 3/1984 | Kley | 178/18 |
| 4,456,787 | 6/1984 | Schlosser et al. | 178/18 |
| 4,523,654 | 6/1985 | Quayle et al. | 178/19 |
| 4,600,807 | 7/1986 | Kable | 178/19 |
| 4,603,231 | 7/1986 | Reiffel et al. | 178/19 |
| 4,623,757 | 11/1986 | Marino | 178/18 |
| 4,648,277 | 3/1972 | Whetstone | 178/18 |
| 4,695,680 | 9/1987 | Kable | 178/19 |
| 4,709,194 | 3/1978 | Kley | 178/18 |
| 4,716,542 | 12/1987 | Peltz et al. | 178/18 |
| 4,786,764 | 11/1988 | Padula et al. | 178/18 |
| 4,883,926 | 11/1989 | Baldwin | 178/18 |

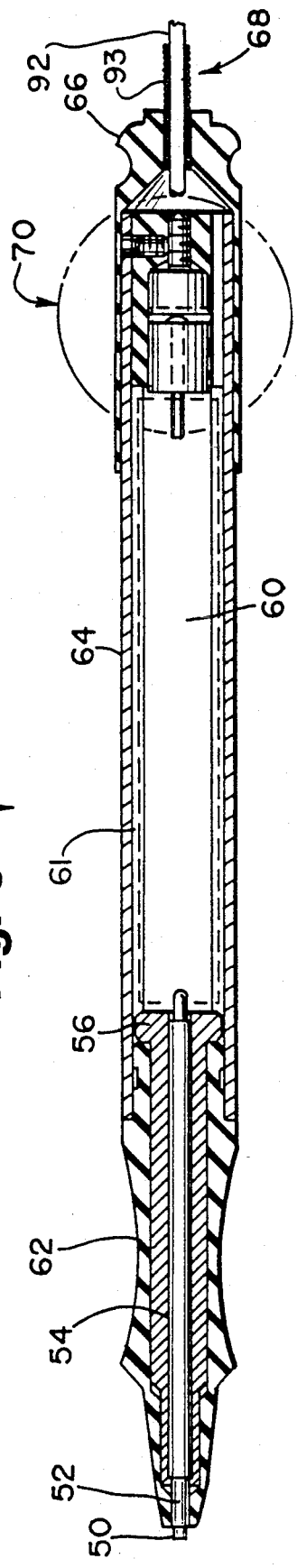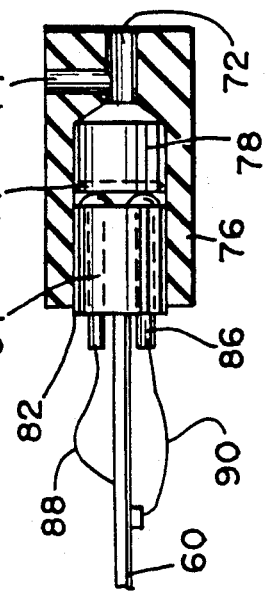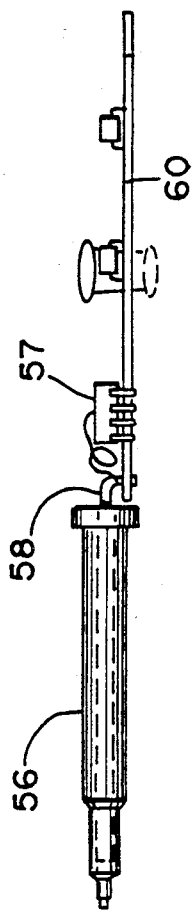

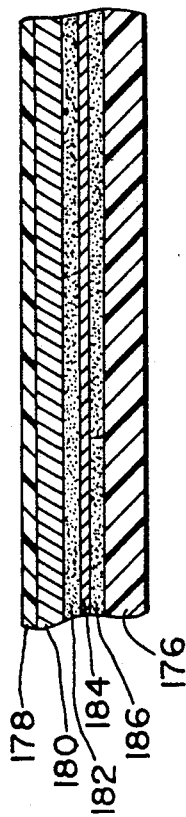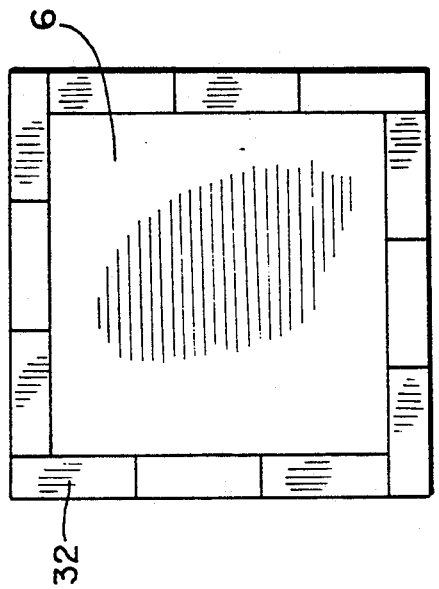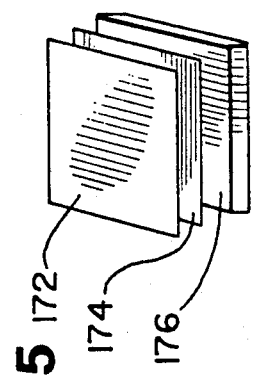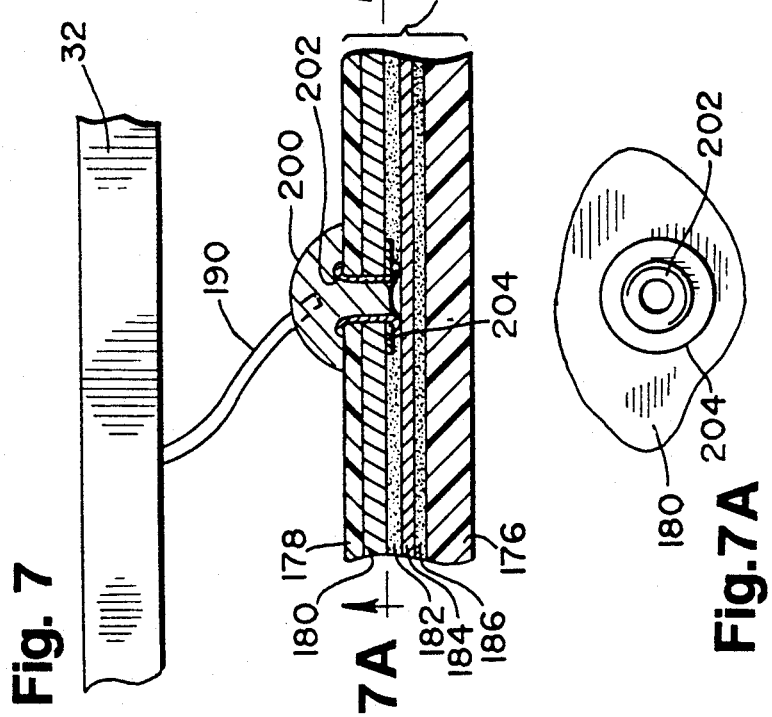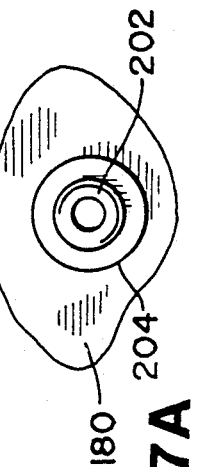

HIGH RESOLUTION SYSTEM FOR SENSING SPATIAL COORDINATES

This is a continuation of application Ser. No. 07/616,732 filed on Nov. 21, 1990, which is a continuation of application Ser. No. 07/363,287 filed on Jun. 7, 1989, which is a continuation of application Ser. No. 07/110,140 filed on Oct. 19, 1987 all now abandoned.

BACKGROUND OF THE INVENTION

1. Field of the Invention

The present invention relates to an improved high resolution system for electrically sensing the spatial coordinates of a electronic point specifying device such as a stylus ("stylus" is used herein to describe the handheld probe or other point specifying device) with respect to a conductive two-dimensional coordinate system independent of variations of the stylus in the third orthogonal dimension. Using a high precision input signal, precision signal processing, and by removing stochastic and deterministic noise, the preset invention improves point sensing precision and accuracy and hence the precision and accuracy of the spatial coordinates calculation.

2. Description of Prior Art

The present invention is an improvement over the prior art as disclosed in U.S. Pat. No. 4,603,231 (the "'231 Patent"), issued to L. Reiffel, et al., for "*System for Sensing Spatial Coordinates*", which is hereby incorporated by reference. The present invention will be described by way of reference to its distinguishments from the '231 Patent.

The present invention provides significant improvements in precision over the prior art as described in the '231 Patent. Substantial improvements in the precision of the sensed coordinates is achieved by substantial removal of stochastic noise signals from the information signal. By removing noise from the information signal, the precision of the present invention is improved over the prior art.

In sensing the position of a coordinate, the prior art system collected information by processing the output of a full-wave rectifier with a low-pass "time-averaging" filter. The low-pass filter weighted the input signal with respect to time such that the most recent signal input had greater weight than the previous signal. The weight of the signal at each instant in time during the sampling period has unacceptably large variance. Although this system was highly precise with respect to its constituent components and the display devices available at the time of its conception, the prior art system cannot provide the precision available with current components and display devices such as high resolution monitors.

The present invention implements a precision integrating system that integrates equally weighted periods of time and averages these periods of time such that all input information has equal weight. The final value of the integration is not dependant on the sequence of input events, only the magnitude and quantity of the events. In contrast with the time averaging or low-pass filtering system of the prior art, in which later events. The weigh more heavily than earlier events. The integrator of the present invention provides improved performance over the low-pass "time-averaging" filter method since the weight of each sample is proportionate to the sample interval. The present invention's signal processing method maintains the integrity of the input signal and reduces noise, thereby improving the precision of the coordinate sensing.

Additionally, the hand held stylus used in prior art systems as an input device was inadequate for the high resolution capabilities of the present invention. Therefore, the stylus, a functionally dependent component of the present invention, provides precision sensing of coordinate location equal to the overall electronic performance of the present invention.

BRIEF DESCRIPTION OF THE DRAWINGS

FIG. 3 is a cross section of the stylus input device of one embodiment of the present invention.

FIGS. 4A and 4B are detailed diagrams of the zero travel switch of one embodiment of the present invention.

FIG. 5 is a diagram illustrating the major component layers in the construction of one embodiment of the conductive surface of the present invention.

FIG. 6 is a cross section of the laminae used in the construction of one embodiment of the conductive surface of the present invention.

FIGS. 7 and 7A illustrate one embodiment of the connection of a printed circuit board to the conductive layer of the composite lamination via a conductive rivet.

FIG. 8 illustrates the positioning of the component printed circuit boards around the perimeter of a transparent laminated conductive surface in one embodiment of the present invention.

DETAILED DESCRIPTION OF THE PREFERRED EMBODIMENT

Figure 1:
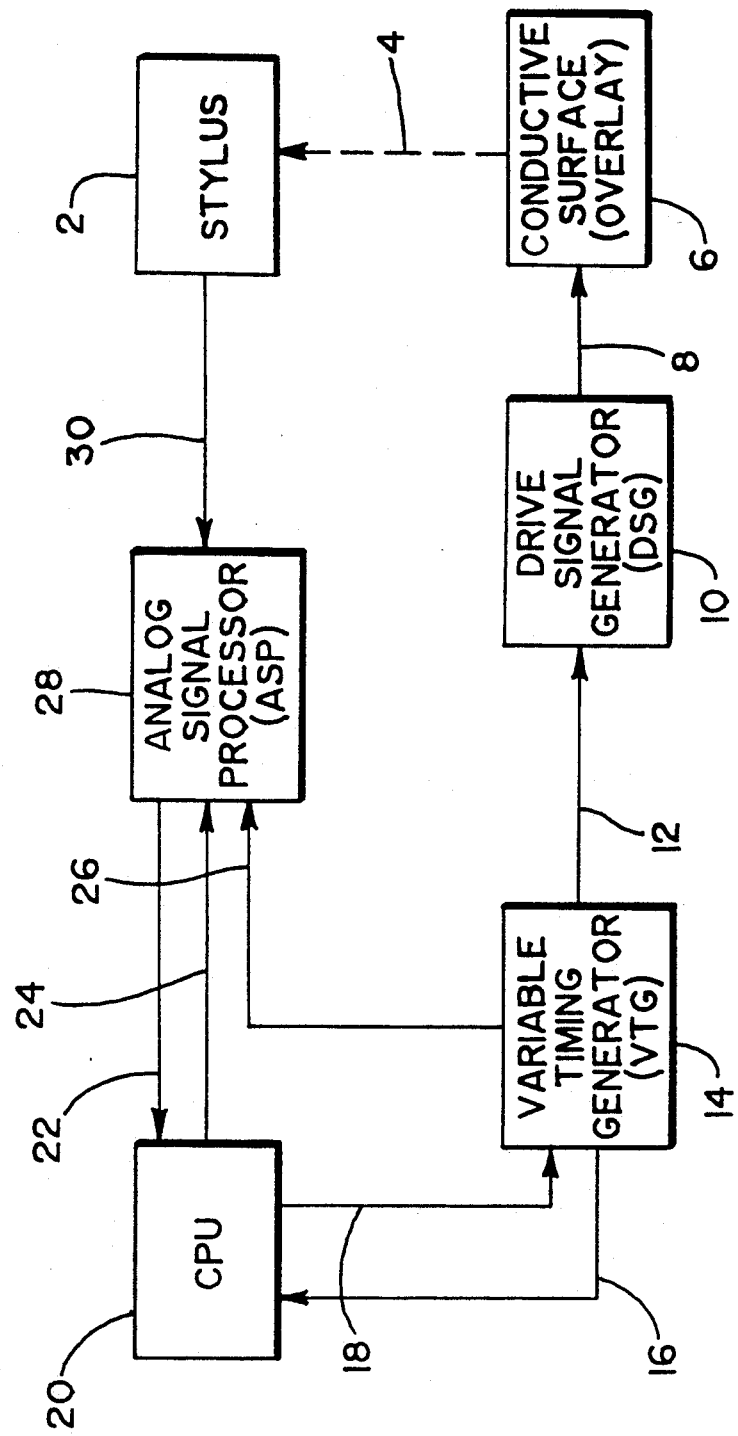
FIG. 1 is a block diagram illustrating the major system blocks of the present invention

FIG. 1 provides an overview of the preferred embodiment of the present invention. The major functional blocks, all as described in the '231 Patent (the terminology used herein sometimes differs from the exact terminology used in the '231 Patent), are depicted in FIG. 1 as follows; drive signal generator (DSG) 10, conductive surface 6, stylus 2, analog signal processor (ASP) 28, variable timing generator (VTG) 14 and central processing unit (CPU) 20. The VTG consists of sequential logic which is well known in the art as in Mano, M. Morris, *Digital Logic and Computer Design*, (1979), which is hereby incorporated by reference. DSG 10 produces a highly precise and consistent system drive signal 8. Drive signal 8 is alternately applied to each of the four sides of conductive surface 6. DSG 10, with timing control signals from VTG 14, alternately drives each of the four sides of conductive surface (overlay) 6 via drive signal 8. As an example of the parameters of such drive signals useful in the present invention, in the preferred embodiment drive signal 8 is an eight (8) volts peak to peak (vpp), positive six (6) volt offset, 250 kHz sine wave.

As depicted in FIG. 1, stylus 2 senses a capacitively coupled signal (denoted as capacitive coupling 4 in FIG. 1) from conductive surface 6 as drive signal 8 is applied to each of the four sides of conductive surface 6. Stylus 2 amplifies the detected capacitively coupled signals 4 (one for each side of conductive surface 6 driven by drive signal 8), and transmits stylus output signal 30 to ASP 28. Stylus 2 also contains a switch (not explicitly shown in FIG. 1) which indicates the status of stylus 2, either "pen up" (not touching conductive surface 6) or "pen down" (touching conductive surface 6). The switch is used to turn off stylus 2 when stylus 2 is not in use. Without this switch, stylus 2 is capable of sensing coordinates with respect to conductive surface 6 without contact with conductive surface 6 and in the third orthogonal dimension, as described in the '231 Patent.

Within ASP 28, a digital gain control (DGC) (not explicitly shown in FIG. 1) sets the gain for stylus output signal 30. The signal gain can be adjusted to allow for full utilization of the entire range of an analog to digital converter (ADC) (internal to ASP 28 and not explicitly shown in FIG. 1) independent of the amplitude of coupled signal 4 detected by stylus 2. ASP 28 also includes a band-pass filter, precision rectifier, and an integrator (see FIG. 2) which, in combination, condition stylus output signal 30 for processing by the ADC internal to ASP 28.

Each of the major blocks presented in FIG. 1 will be developed in further detail throughout the detailed description of the preferred embodiment.

Figure 9:
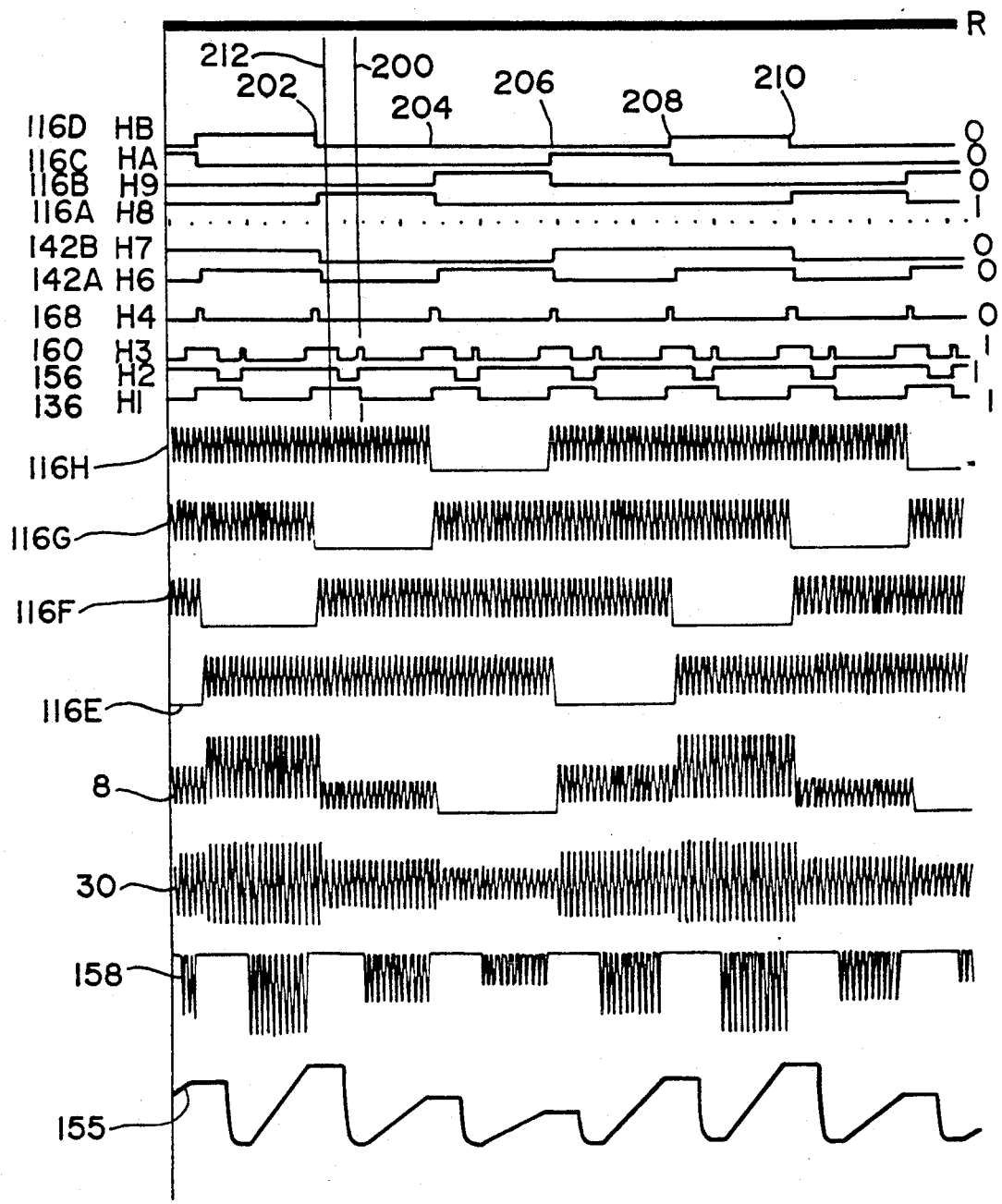
FIG. 9 illustrates the timing relationships of one cycle for driving the four edges of the conductive surface in the preferred embodiment.

FIG. 9 illustrates the timing relationships used in the preferred embodiment for one cycle of driving the four edges of conductive surface 6. Signal 142 (comprising two discrete digital signals 142A and 142B) provides a two (2) bit encoded signal which identifies which edge of conductive surface 6 will be driven during time periods 202-204, 204-206, 206-208 and 208-210. Non-rectangular alternative embodiments of the present invention use the same principal as that of rectangular conductive surface 6. Signal 142, however, may require more than two (2) bits for the drive direction coding for conductive surfaces shapes with more than four (4) sides.

Starting at point 202, the two (2) bit encoded signal produced by signal 142 A,B is 0,0, which, for this example, indicates that the edge controlled by signal 116A is grounded and the edge opposite to the edge controlled by signal 116A is driven by drive signal 8 during time interval 202-204. Similarly, beginning at point 204, the two (2) bit encoded signal 142 A,B is 1,0, and the edge controlled by signal 116B is grounded and the edge opposite to the edge controlled by signal 116B is driven by drive signal 8 during time interval 204-206; beginning at point 206, the two (2) bit encoded signal 142 A,B is 0, 1, and the edge controlled by signal 116C is grounded and the edge opposite to the edge controlled by signal 116C is driven by drive signal 8 during time interval 206-208; and beginning at point 208, the two (2) bit encoded signal 142 A,B is 1,1, and the edge controlled by signal 116D is grounded and the edge opposite to the edge controlled by signal 116D is driven by drive signal 8 during time interval 208-210. As is apparent from FIG. 9, encoded signal 142A,B identifies the edge of conductive surface 6 to be grounded and the edge of conductive surface 6 to be driven by drive signal 8 during a specified time interval, and thus provides a logical means to timely apply drive and ground signals for all four (4) drive directions of conductive surface 6.

Also shown in FIG. 9 are the signals which control particular components of the preferred embodiment of the present invention (see FIG. 2): analog to digital converter control signal 168, integrator control signal 160, integrator reset control signal 156, rectifier control signal 136, and the relationship of these signals with respect to edge drive control signals 116 A-D and two (2) bit encoded drive direction signal 142 A,B.

Figure 10:
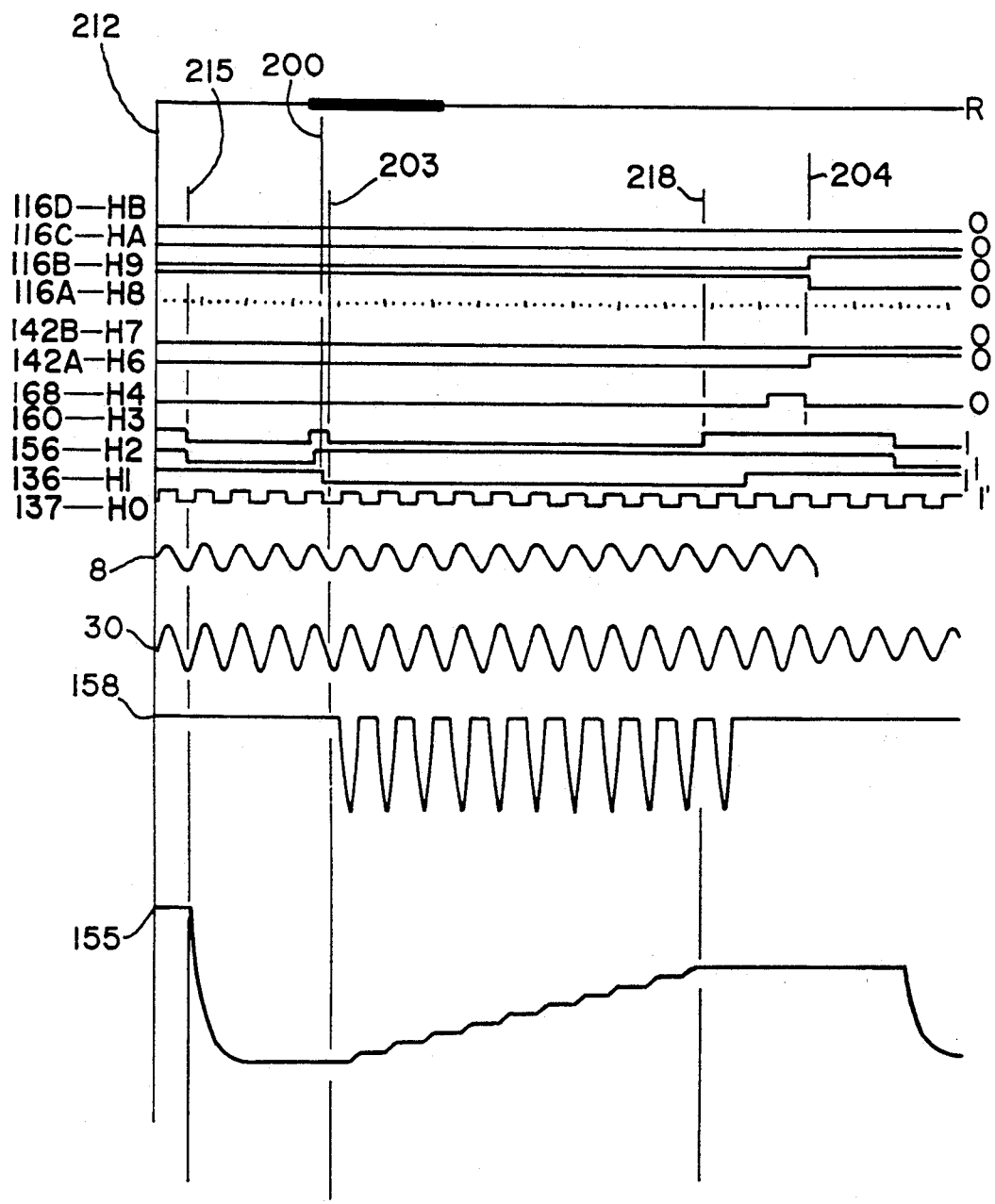
FIG. 10 is an enlargement of a particular interval of the timing diagram of FIG. 9 for illustrating the significance of timing relationships on the precision of the present invention.

FIG. 10 provides an enlargement of interval 212-204 in FIG. 9 to more fully illustrate the relationships among various digital and analog signals and the effect of these relationships on the precision of the present invention. Interval 215-216 of integrator output signal 155 shows the substantially exponential decay of integrator output signal 155 during a beginning portion of drive cycle interval 202-204 (see FIG. 9). In the preferred embodiment, interval 203-218 of integrator output signal 155 illustrates integrator input signal 158 being sampled for ten (10) periods. The section of integrator output signal 155 from 203 to 218 represents the integral, multiplied by a constant, of integrator input signal 158. It should be noted that switching the integrator on and off, at points 203 and 218, respectively, of FIG. 10 occurs at a point in time when half wave rectified system input signal 158 is at zero. Switching at zero periods prevents the addition of the signal distorting switching spikes and phase jitter error to the drive signal.

Figure 11:
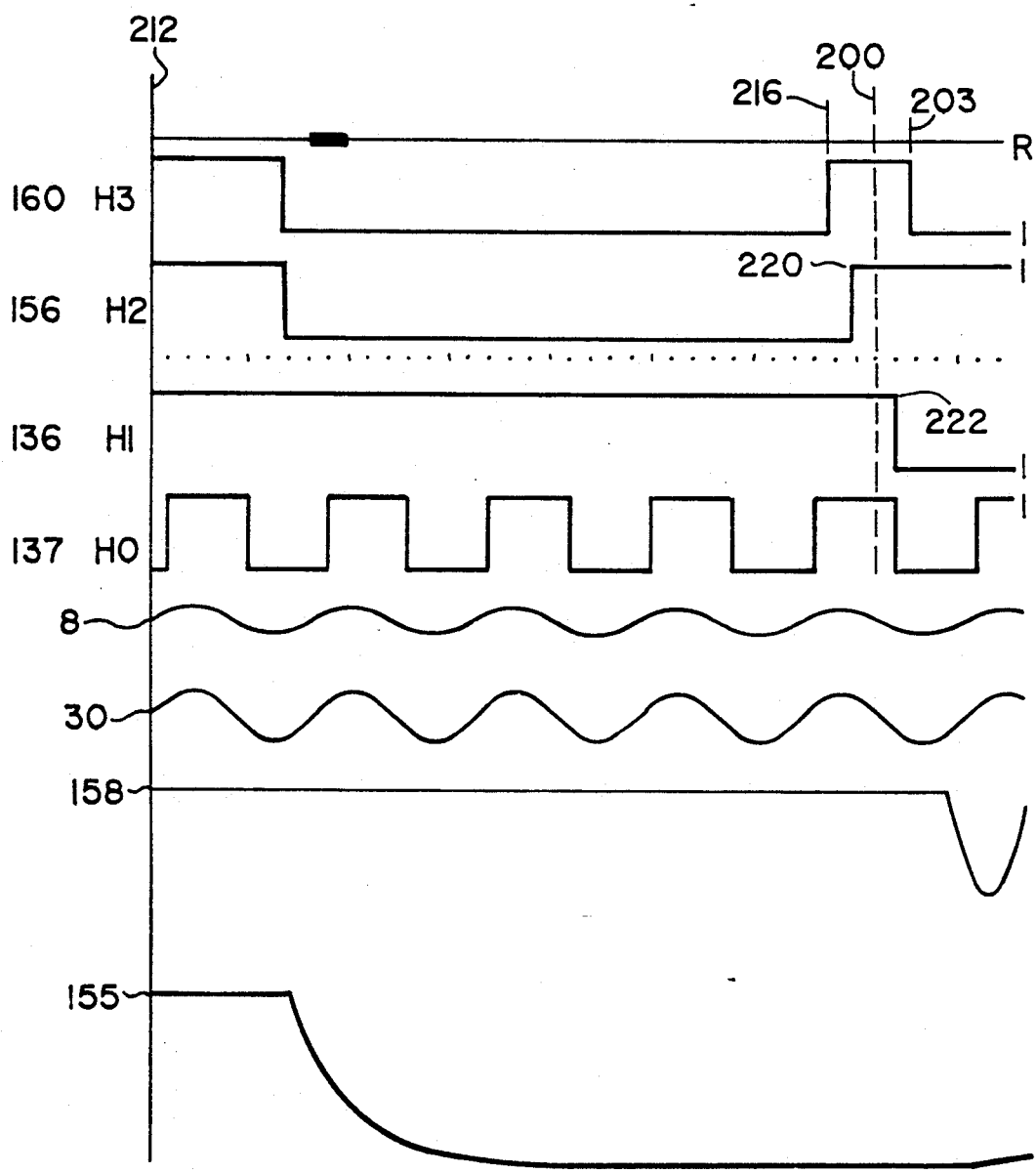
FIG. 11 is a horizontal and vertical enlargement of a particular interval of the timing diagram of FIG. 10 for illustrating the significance of timing relationships on the precision of the present invention.

FIG. 11 provides a horizontal and vertical enlargement of a time interval near timing event 200 of FIG. 10 to more fully illustrate the timing relationships and the effect of these relationships on the precision of the present invention. Of particular significance in FIG. 11 is near timing event 200 involving integrator control signal 160, integrator reset switch control signal 156 and output rectifier switch control signal 136. At time 216 integrator 102 (see FIG. 2) is turned off by integrator control signal 160 and at time 203 integrator 102 is turned on by integrator control signal 160. At time 220, subsequent to integrator 102 turn off at time 216, integrator reset switch 100 is turned off by integrator reset switch control signal 156. At time 222 rectifier output switch 46 is turned on by output rectifier switch 136. Up until time 222 of FIG. 11, rectifier output switch 46 is turned off, and no analog input signal (ultimately originating at stylus 2 of FIG. 1) is passed to integrator 102.

When signals 160 and 156 are simultaneously low, both integrator 102 and integrator reset switch 100 are turned on. During the time when integrator 102 and integrator reset switch 100 are both turned on and when rectifier output switch 136 is switched off, the charge built up on the capacitor internal to integrator 102 (the capacitor is not explicitly shown in FIG. 2) decays exponentially through path 154 of FIG. 2, as shown in FIG. 10 interval 215-203, to an insignificant level. Since rectifier output switch 46 is not permitting input signal 158 to be integrated during the time when integrator 102 and integrator reset switch 100 are both on, any residual charge is dissipated from the capacitor internal to integrator 102 through path 154 of FIG. 2. The dissipation of the charge on the capacitor prevents any residual charge from offsetting the next integration of input signal 158 to integrator 102. While the capacitor internal to integrator 102 never discharges completely to zero, the charge on this capacitor is allowed to decay exponentially such that the total value of the integration cycle is not distorted by residual charge from the previous integration. In the preferred embodiment of the present invention, the charge is allowed to decay for approximately 14 microseconds, resulting in residual charge within one least significant bit of the reset voltage.

Figure 2:
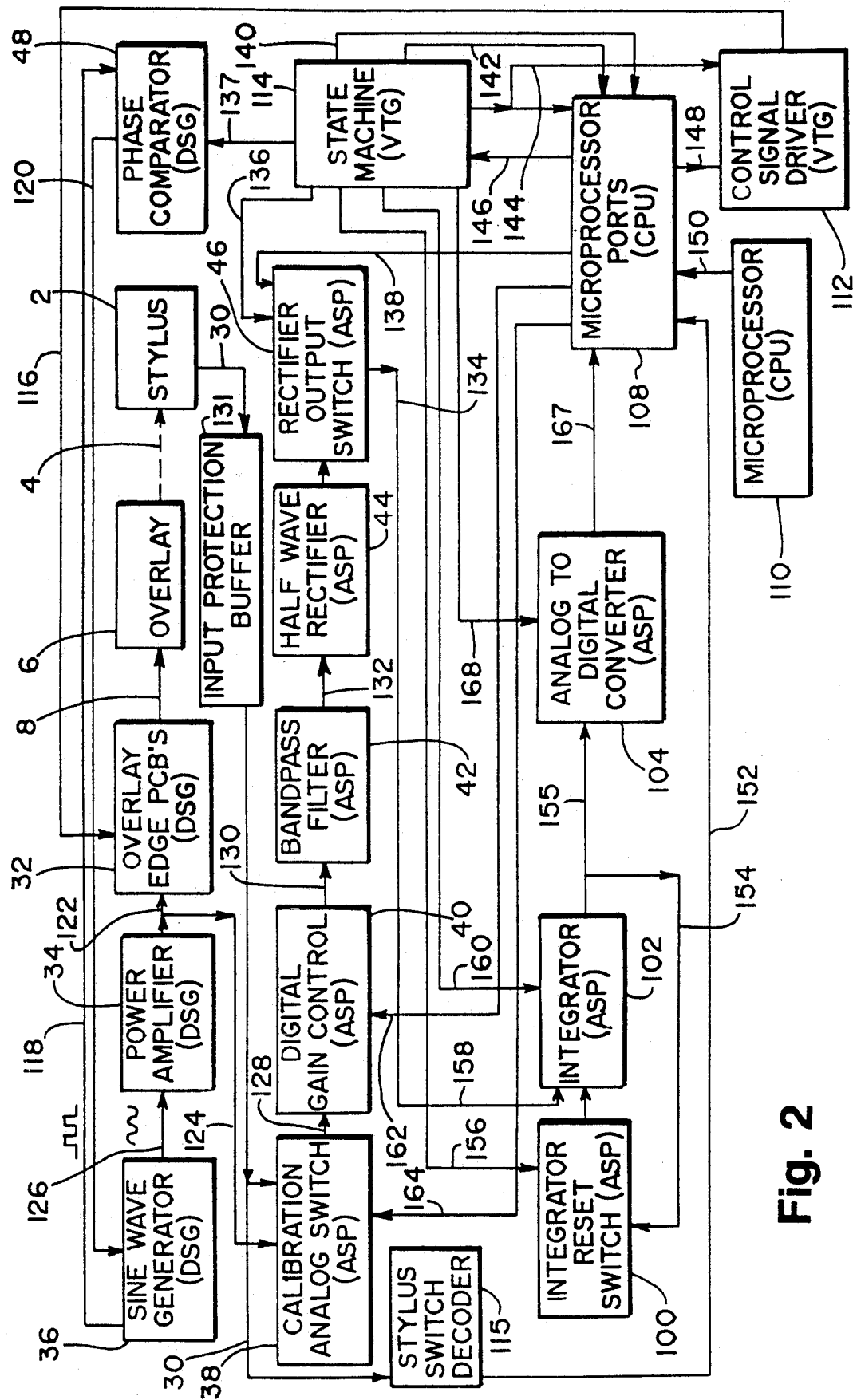
FIG. 2 is a detailed block diagram illustrating the preferred embodiment of the present invention.

FIG. 2 provides a detailed block diagram of the improved system for sensing spatial coordinates of the present invention. Sine wave generator 36 generates a stable-amplitude sine wave output 126 and a corresponding square wave output 118. In the preferred embodiment of the present invention sine wave generator 36 is an Intersil ICL8038 Precision Waveform Generator/ Voltage Controlled Oscillator. Use and application of such a wave generator is known in the art and is described in *Intersil Hot Ideas in CMOS Data Book*, (1983/1984), which is hereby incorporated by reference. Sine wave output 126 is used as the system driving signal and square wave output 118 is used to phase lock sine wave generator 36 to state machine 114. Sine wave output 126 and square output 118 have a substantially fixed phase relationship as established by sine wave generator 36. Phase comparator 48 of the preferred embodiment, to which square wave output 118 is input, is a National Semiconductor MM74HC4046 CMOS Phase Lock Loop. Use and application of such a phase lock loop is known in the art and is described in *National Semiconductor Logic Data Book Volume* 1, which is hereby incorporated by reference.

The consistency of the amplitude of sine wave output 126 provides a highly stable and therefore highly predictable system driving waveform for the present invention. The predictability of the driving waveform minimizes one area of errors, which increases the reliability of the processed information and subsequently increases the overall precision of the present invention.

Phase comparator 48 is used to phase lock the independent, free-running sine wave output 126 from sine wave generator 36 to the oscillator (not explicitly shown) in state machine 114 thereby maintaining a constant phase angle between sine wave output 126 and the oscillator in state machine 114. As is known in the art, maintaining a constant phase angle by phase locking prevents out of phase signals from drifting or "creeping" in phase or frequency. It is difficult to filter out low frequency noise created by changing phase between signals, and phase locking with phase comparator 48 eliminates the need to filter out low beat frequencies between the two independent oscillators (sine wave generator 36 and the oscillator in state machine 114). Phase comparator 48 causes sine wave generator 36 to oscillate at substantially the same frequency as the incoming carrier frequency that is generated by the oscillator in state machine 114, which in the preferred embodiment is 250,000 Hz. A major advantage of the use of phase comparator 48 is that, since the clock driving CPU 110 is derived from the clock internal to state machine (this clock is not explicitly shown in FIG. 2), any noise generated by CPU 110 is synchronized with sine wave generator 36, thereby increasing the precision of the present invention.

As described above, phase comparator 48 phase locks sine wave generator 36 and the oscillator internal to state machine 114. Any digital noise generated or picked up by sine wave generator 36, ASP 28 or associated circuits is synchronous with respect to the start and stop periods for integrator 102, which is driven by a clock derived from the oscillator internal to state machine 114, as noted in the discussion of FIG. 9 and FIG. 10 above. The synchronization of noise to these clocks results in the elimination of phase shifts of "digital noise" with respect to analog signal 30, which reduces system noise when using the "Reference Shift Technique" described in the '231 Patent. Phase lock loop techniques utilized in the preferred embodiment contribute to increased precision of the present invention.

Sine wave output 126 is amplified by power amplifier 34. An example of a component suitable for use in the present invention is the National Semiconductor LM318 Operational Amplifier. The use of such a component as an LM318 Operational Amplifier in combination with output transistors and passive components to implement a power amplifier such as power amplifier 34 is known in the art and is described in such publications as the *National Semiconductor Linear Data Book*, which is hereby incorporated by reference. The output of power amplifier 34 is used to drive the conductive surface 6 through overlay edge PCBs 32, further described below.

As is known in the art, a sinusoidal waveform is characterized by its peak value $V_p$, its frequency w and its phase with respect to an arbitrary reference time. Since sine wave output 126 from sine wave generator 36 is generated with high consistency and precision, overlay drive signal 122 output from power amplifier 34 is more consistent and precise and provides a substantial improvement in performance of the present invention over prior art systems.

In the preferred embodiment, edge driver printed circuit boards (PCBs) 32 around the perimeter of conductive surface 6 are such that multiple identical PCBs apply respective drive signals to the edges of conductive surface 6. In another embodiment, the edge driver circuitry (PCBs 32) is embodied in a single, contiguous PCB 32 with its center cut out, wherein the center cut-out is in the shape of conductive surface 6 and permits connection of conductive surface 6 to edge driver PCB 32.

Edge driver PCBs 32 apply drive signals from power amplifier 34 to the respective edges of conductive surface (see FIGS. 8 and 12) 6. Driving of the edges of conductive surface 6 is performed by drive buffers included on edge driver PCBs 32 (not explicitly shown), which provides alternating current to alternating opposite edges of conductive surface 6 as determined by control signals generated by variable timing generator (VTG) 14 (see signals 116A–D and 142 A,B of FIG. 9). VTG 14 sends control signal 12 (see FIG. 1) to the drive buffers on edge driver PCBs 32, thereby causing the drive buffers to supply current to each pair of opposite edges of conductive surface 6 in turn. Through appropriate control signals generated by VTG 14, drive signal current is alternately supplied to the pair of opposing edges perpendicular to a defined "X axis" for a relatively short predetermined period of time, and then supplied to the opposing edges perpendicular to a defined "Y axis" for another relatively short predetermined period of time (the X axis and the Y axis are substantially perpendicular in the preferred embodiment). Thus at any moment, an alternating current sheet will be flowing between one pair of opposing edges, and later such current will flow between the other pair of opposing edges. The voltage induced by this alternating current flow, which is sensed by stylus 2, is therefore a variable in both time and position, depending upon which pair of edges are being supplied current and upon the position of stylus 2 relative to conductive surface 6.

Figure 12:
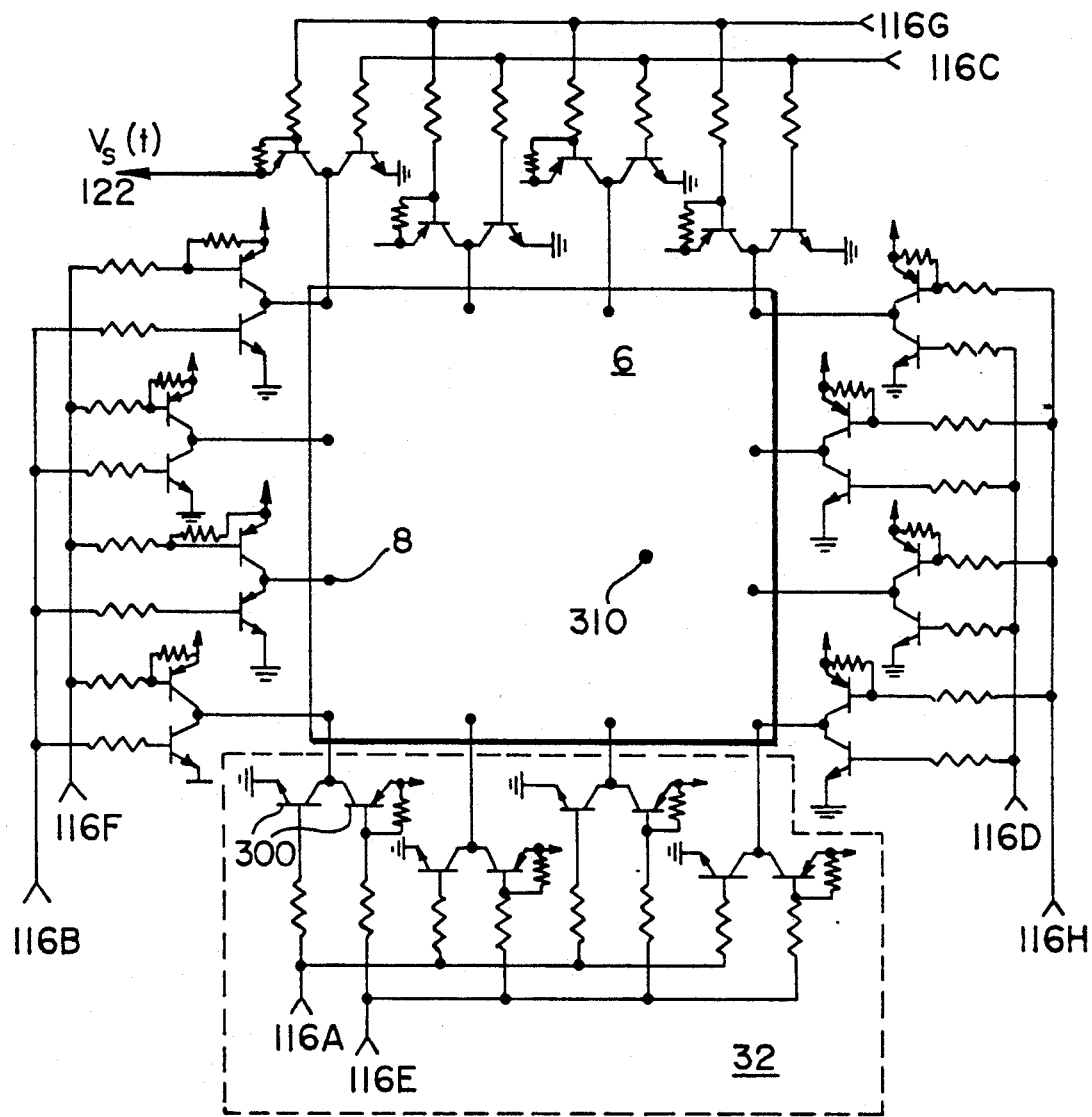
FIG. 12 is a schematic of the edge driver PCB boards.

Although many types of drives may be used, FIG. 12 shows a schematic of the preferred embodiment of the present invention, which utilizes bipolar junction transistors to provide the required current across the conductive surface. These drive transistors are mounted on overlay edge PCB 32 directly above the points they drive. The bipolar junction transistors 300 provide a more precise method of ensuring that the entire reference edge is at ground.

Conductive surface 6 of the preferred embodiment is constructed as shown in FIG. 5, FIG. 6 and FIG. 7. Illustrated in FIG. 5 are the three primary laminate components: conductive film 172, adhesive film 174 and plexiglass layer 176, respectively. In the preferred embodiment of the present invention each layer is a continuous surface of material. Adhesive film 174 bonds conductive film 172 to plexiglass layer 176.

In the preferred embodiment, plexiglass layer 176 protects and supports the layers comprising conductive surface 6. while also providing a surface on which to print illustrative graphics, such as representations of controls for conductive surface 6 as is described in U.S. patent application Ser. No. 914,924 filed Oct. 3, 1986 by Jakobs, et al, for "Integrated Multi-Display Overlay-Controlled Workstation," which is hereby incorporated by reference. The graphics are printed on plexiglass layer 176 on the surface between adhesive layer 186 (see FIG. 6) and plexiglass layer 176 so that if a user contacts conductive surface 6 with stylus 2, the graphics are protected from abrasive wear by contact with stylus 2.

It is apparent to on skilled in the art that alternative materials can be utilized for the protective and supportive surface material other than plexiglass as in plexiglass layer 176. Opaque materials may be used as well as transparent materials, with or without graphics printed on the material. An alternative surface may be of a patterned or randomly textured material.

FIG. 6 illustrates in greater detail the various layers of material which comprise conductive surface 6 in the preferred embodiment of the present invention. Of the three primary layers from FIG. 5 172, 174 and 176, conductive film 172 and adhesive film 174 are comprised of sub-layers. Conductive film 172 has conductive material 180 deposited or otherwise coated on mylar film 178. In other embodiments other suitable film substrates are substituted for mylar film 178. Adhesive film 174 consists of film substrate 184, on both sides of which is coated with adhesive layers 182 and 186 which serve to bond conductive film 172 to plexiglass layer 176.

The preferred embodiment of the present invention use a continuous layer of electrically conductive indium tin oxide (ITO) of uniform resistivity for conductive material 180, which is deposited on mylar film 178. Although ITO has been specified as conductive material 180 comprising the conductive layer of conductive surface 6, alternative suitable conductive materials are used in other embodiments. The conductive layer can be of continuous or semi-continuous electrically conductive material. In the preferred embodiment it is advantageous for conductive surface 6 to be transparent as it can then be placed in front of visual display devices such as CRTs, liquid crystal displays or video projection devices, wherein these display devices produce the electrical representation of the corresponding spatial coordinates on a graphic display. Among the alternative optically transparent, conductive materials suitable for use as conductive material 180 to be coated or otherwise deposited on mylar film are: stannous oxide, indium oxide, or thin metal films deposited on a transparent substrate of quartz, glass, or optical grade acetate. In an alternative embodiment, wire meshes or etched sheets are used in situations demanding extreme ruggedness, large areas, or non-rectilinear surfaces.

The drive direction of the current in conductive surface 6 is controlled by control signal driver 112 (see FIG. 2). Control signal driver 112 receives four (4) bits of decoded directional information 144 from state machine 114 and also receives control signal 148 from microprocessor ports 108. Inputs 144 and 148 to control signal driver 112 provide the necessary information to control the drive directions of conductive surface 6 via conductive surface edge PCBs 32. Control signal driver 112 provides eight (8) edge PCB 32 control signals 116 per pair of coordinates sensed, two (2) control signals 116 for each drive direction.

As illustrated in FIGS. 7 and 7A, in the preferred embodiment PCBs 32 are connected to the drive points of conductive surface 6 via wire 190. A plurality of such wires as wire 190 are connected along the perimeter of conductive surface 6 at predetermined substantially equidistant intervals. As an example of the connection at each drive point along the perimeter of conductive surface 6, FIGS. 7 and 7A will be further described. Wire 190 is fixed to conductive rivet 202 with flexible conductive material 200. The electrical connection between rivet 202 and conductive material 180 is enhanced by a ring of conductive ink 204 placed on top of conductive material 180. By securing rivet 202 to both sides of conductive film 172, and thereby creating a conductive bridge, the protection afforded by mylar film 178 over the conductive material 180 is retained without a decrease in conductivity. Further, the use of flexible conductive material 200 to secure wire 190 to rivet 202 reduces the stresses exerted on the joint between wire 190 and rivet 202, which reduces the possibility for failure of this joint, thereby enhancing mechanical reliability.

Figure 2A:
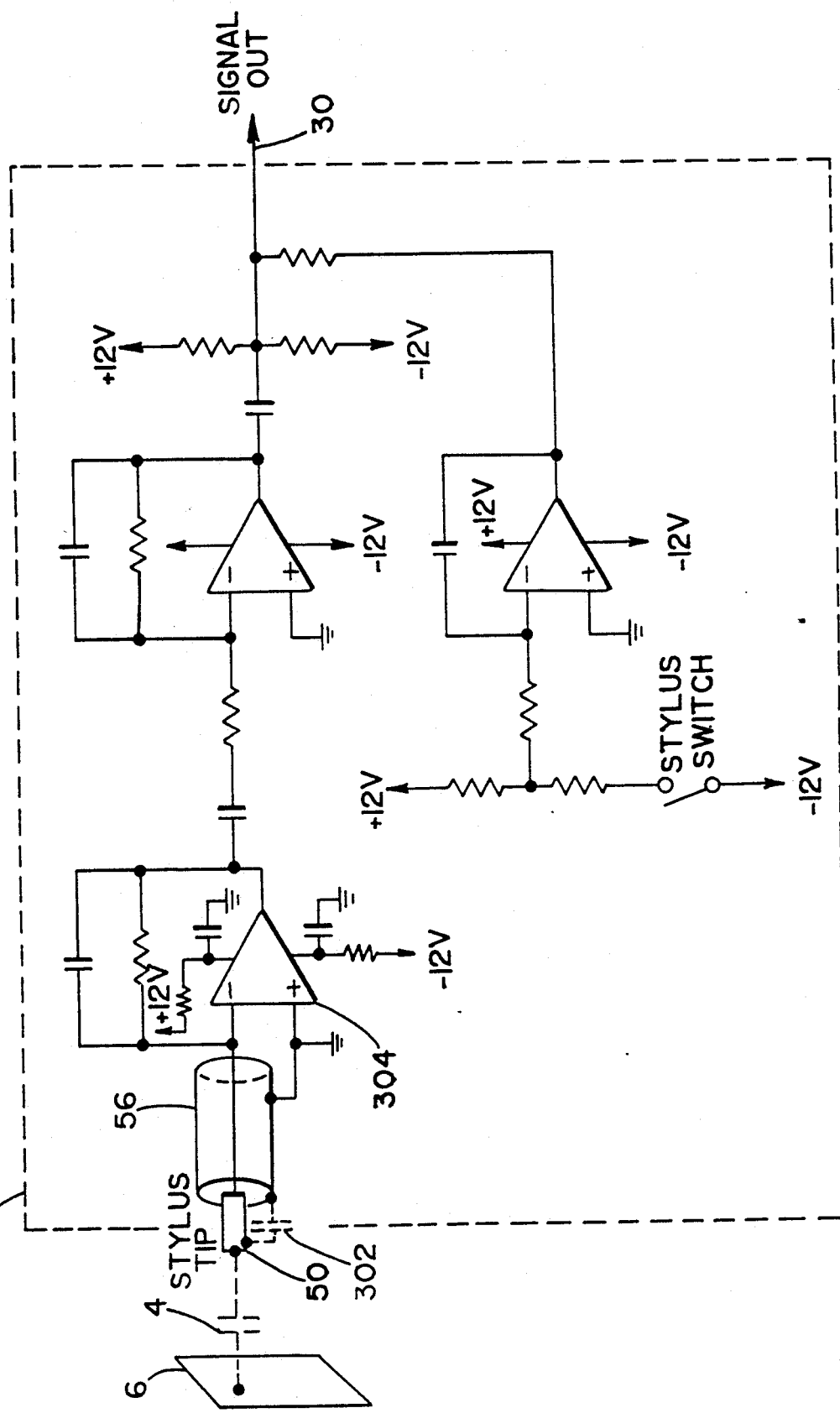
FIG. 2A is a schematic of the stylus signal sensing circuitry.

With reference to FIG. 2 and FIG. 2A, conductive surface 6 as detailed above is electrostatically coupled (denoted as coupling 4) to stylus tip 50. Conductive surface 6 is capacitively coupled to an inverting op am 304 internal to stylus 2 via what is known in the art, see Tobey, Graeme, Huelsman, *Burr-Brown Operational Amplifiers Design and Applications,* (1971), as a current input to op amp 304 that is at virtual ground. The current input at virtual ground results in no voltage swing across the parasitic capacitance 302. Since the current input of stylus 2 has low impedance, the voltage induced on it is small and the resulting parasitic current to the antenna shield 56 of stylus 2 is small, resulting in small loss of coupled signal 4 to stylus 2 thus maximizing the available energy to op amp 304. While voltage sensing could be used as the input signal to stylus 2, the voltage induced on the signal 30 would be high and the resulting parasitic current through parasitic capacitance 302 to the antenna shield would also be high, resulting in detrimental effects to the signal.

In a preferred embodiment of the present invention, stylus 2 is constructed as shown in FIG. 3. The preferred embodiment of stylus tip 50 consists of an electrically conductive composite material. A tip constructed of conductive material essentially locates the signal sensing tip of stylus 2 at the signal transmission source on conductive surface 6.

For the preferred embodiment of stylus tip 50, teflon is used as a friction reducing matrix material in which the preferred conductive material within the matrix is carbon. Carbon serves as an efficient conductive material for stylus tip 50.

Brass sleeve 52 provides a rigid structure to support non-rigid stylus tip material 50. Sleeve 52 is wrapped with an insulating material 54 so that brass sleeve 52 does not contact electromagnetic shield 56. Stylus tip 50 is shielded from electromagnetic noise sources such as fingers by electromagnetic shield 56.

In the preferred embodiment, stylus 2 also includes plastic grip 62 as shown in FIG. 3. Plastic grip 62 is contoured to optimize the comfort of the user's grip on stylus 2 and the position of the user's hand relative to stylus tip 50. The user's hand must grip stylus 2 close enough to stylus tip 50 in order to control stylus 2 in a comfortable and intuitive fashion. However, if the user's fingers are too close to stylus tip 50, stylus 2 will sense the user instead of conductive surface 6, resulting in distortion of the actual location of stylus 2 relative to conductive surface 6. Additionally, locating the grip with the user's fingers positioned too close to stylus tip 50 will make stylus 2 feel unbalanced, difficult to control and tiring to use.

The concave design of plastic grip 62 serves two purposes. First, the concave design forces the user to grip stylus 2 in the optimum position which keeps the user's fingers away from stylus tip 50 while providing a comfortable balance of stylus 2. Second, the concave design maintains a comfortable diameter for gripping stylus 2 while the diameter of stylus body 64 can be increased to increase the amount of circuitry which can be contained in stylus body 64.

Within stylus body 64, electromagnetic shield 56 contains stylus tip 50, brass sleeve 52 houses stylus tip 50 and insulation 54 covers brass sleeve 52. Electromagnetic shield 56 acts to shield the antenna created by stylus tip 50 and brass sleeve 52 from fingers and other sources of electro-magnetic radiation which could induce noise into the input signal path. Electromagnetic shield 56 has a limited range of movement along the major axis along the length of stylus 2 to accommodate compression from writing movements.

With reference to FIGS. 3, 4A and 4B, stylus electronics printed circuit board (PCB) 60 inclosed in stylus body 64 is attached to stylus tip assembly (comprising stylus tip 50, brass sleeve 52 and insulation 54) by wire 58, which is bent to fit in a thru hole on the PCB 60 and soldered in position. Wire 58 is the electrical connection between stylus tip assembly (50, 52 and 54) and PCB 60 electronics as well as a mechanical link between stylus tip 50 and stylus activating zerotravel switch 70. PCB 60 is held in position at the other end between two posts 84 and 86 which comprise part of zero travel switch 70. Additionally, PCB 60 is. wrapped in low friction teflon insulating material 61 which protects the circuitry located on PCB 60 from possible accidental shorting on stylus body tube 64 and prevents stylus PCB 60 from dragging on stylus body 64.

In an alternative embodiment, PCB 60 is notched to permit wire 58 to be soldered directly to PCB 60. Further, the pressure required to activate the zero travel switch 70 can be varied by placing an "O" ring between shield 56 and PCB 60. Such an "O" ring places PCB 60 in compression thereby reducing the travel required to activate zero travel switch 70. Adjustment screw 72 is used to adjust the amount of pressure required to actuate switch 70.

Positioned opposite the grip end of stylus is zero travel switch 70. This switch is positioned opposite of the grip so as to minimize the effect of switch noise on the stylus input signal and the stylus electronics. As illustrated in greater detail in FIG. 4B, PCB 60 is held between two posts 84 and 86. Two posts 84 and 86 are composed of a conductive material. In the preferred embodiment two posts 84 and 86 are made of brass. Two posts 84 and 86 are held in position by a post position retainer 82. Post position retainer 82 is made of an insulating material such as non-conductive plastic and possesses a relatively low coefficient of friction with respect to the material used for zero travel switch housing 76. Two posts 84 and 86 are connected to two wires 88 and 90, which are connected to circuit pads on PCB 60. The wires 88 and 90 are long enough to permit movement of PCB 60 so as not to obstruct the operation of stylus 2 when stylus tip 50 is compressed.

Two posts 84 and 86, post position retainer 82, pressure sensitive elastic conductive material (PSECM) 80, PSECM holder 78 and take-up screw 72 are contained in the zero travel switch housing 76. PSECM 80 used in this switch is manufactured by PCK Elastomerics, Inc. Hatboro, Pa. 19040. By tightening take up screw 72 excess movement is removed from the stylus assembly, thus minimizing the travel required to activate zero travel switch 70. Set screw 74 secures the position of zero travel switch 70 within stylus.body 64. Stylus end cap 66 fits onto the end of stylus 2 to seal the assembly. Stylus umbilical 68 feeds through the end of stylus end cap 66.

To activate zero travel switch 70, the user touches stylus tip 50 to conductive surface 6. Pressure exerted from touching conductive surface 6, such as typical handwriting pressure, causes position retainer 82 (and thereby two posts 84 and 86) to transfer the pressure to PSECM 80 which is compressed. When PSECM 80 is compressed, the conductive particles suspended in the matrix make contact and conduct. The current conducted from power supply post 86 through PSECM 80 conducts normal to the surface contact point; therefore, for the current to reach the other post, PSECM holder 78 must be constructed of a conductive material to act as a conductive link in the current path between the two posts. For the preferred embodiment, PSECM holder 78 is. made of brass. The current is conducted normal to the surface contact point on PSECM 80 and is conducted through PSECM holder 78 where it conducts back through PSECM 80. At the point in PSECM 80 compressed by post 84 the current follows the normal path to post 84 which conducts the current to PCB 60. When the pressure is removed from stylus tip 50, the circuit is opened and the current is switched off.

Stylus umbilical 68 carries four wires to PCB 60 inside of stylus body 64; +12 /v, −12 V, signal and board ground (not explicitly shown). These wires connect to the specific circuit pad locations on PCB 60 per the specific design of PCB 60. Stylus umbilical 68 runs along the inside of the stylus body 64 through a slot (not shown) cut into zero travel switch body 76. All four wires are attached with enough length so as not to impair the movement of the internal components of stylus 2. Umbilical shielding 92 is connected to, a stiff length of conductive material 93 (shown as a stiff spring) which contacts the inside of the stylus body 64 which functions to ground stylus body 64. In an alternative embodiment, additional wires are brought to stylus 2 through umbilical 68 in order to increase the variety of functions which are controlled by stylus 2.

Differential amplifier 57 has been located in stylus 2 so as to permit the processing of the analog signal from conductive surface 6 at the closest point possible to the signal origin. Processing the signal at the signal source maximizes the signal to noise ratio and therefore minimizes the effect of any noise developed along stylus umbilical 68. Further, the combined noise reducing effects of electromagnetic shield 56 over stylus tip 50 and the design of plastic stylus grip 62 eliminate two paths that have the potential for introducing precision damaging noise into the system. For the preferred embodiment of the present invention an OPA37GU Wide-Bandwidth Operational Amplifier is used to perform the differential amplifier functions. The use and application of this operational amplifier for use as in the invention is known in the art and described in the *Burr-Brown Product Data Book Supplement,* which is hereby incorporated by reference.

Further, PSECM 80 used in zero travel switch 70 does not produce an instantaneous voltage change. Zero travel switch 70 of the type as used in the preferred embodiment is connected to a conventional operational amplifier integrator, allowing lower switch power while maintaining equal rise and fall times, (included on PCB 60; not explicitly shown) which has a characteristic voltage ramping which is added to the signal from stylus tip 50 as a DC offset. Since instantaneous voltage changes are not present and the ramping is smooth, switching spikes, another source of unwanted noise, are eliminated.

The signal received by stylus tip 50 is amplified before it is transmitted to the signal processing circuitry. In the preferred embodiment of the present invention, the amplified signal typically is 10 V peak to peak maximum. Increasing the voltage of the signal maximizes the signal to noise ratio thereby resulting in increased signal accuracy.

Further, the slope (e.g., bandwidth) of signal 30 is limited by the operational amplifier integration in stylus 2 (not explicitly shown; more fully described above) to keep the energy of the information below the frequency of band pass filter 42. Spikes are created when the slope of the signal is not limited in bandwidth. The spikes distort the information on the input signal. When the signal is processed by band pass filter 42 the spikes are removed along with some of the information from the input signal. The consequent loss of information from the input signal compromises the precision of the system. By limiting the sloping of the signal, the present invention prevents high frequency spikes, which would otherwise distort the information being communicated from the stylus, thereby improving the precision of the present invention.

While the above description of the preferred embodiment of the user input device refers to a stylus-type device, it is apparent to one skilled in the art that alternative input devices can be used in conjunction with the present invention while maintaining the spirit of the present invention. One form of alternative input device is an input device commonly referred to in the art as a "puck". The puck consists of two pieces of antenna wire mounted in a rigid frame, a conductive loop, or a disc of ITO coated mylar. The two antenna wires are used as cross hairs to locate the overlapping sections of the antenna wires over the desired target. While this form of input device provides an increase in system accuracy, it is not as conducive as stylus 2 to handwriting motion control of conductive surface 6.

Referring to FIG. 2 input protection buffer 131, which is the preferred embodiment is comprised of National Semiconductor LM318 op amp, protects the system electronics from static charges. The op amp of input protection buffer 131 dissipates static charges accumulated on conductive surface overlay 6 and conducted through stylus 2.

Still referring to FIG. 2, analog signal 30 is the amplified signal detected by electrostatic coupling 4, which is sensed by stylus 2 from conductive surface overlay 6. Analog signal 30 carries information on the location of stylus 2 with respect to conductive surface 6. Analog signal 30 also serves as input for stylus switch decoder 115. Since the switch frequency required by stylus switch decoder 115 is low, and band pass filter 42 does not pass frequencies in this range, stylus switch decoder 115 uses unprocessed stylus input signal 30.

Stylus switch decoder 115 transmits 1 bit of switch information 152 indicating when stylus 2 is switched on or off (i.e., "pen up" not contacting conductive surface 6, "pen down" contacting conductive surface 6). Stylus switch signal 152 is transmitted from stylus switch decoder 115 to provide a signal that stylus 2 is writing ("pen down"). For the preferred embodiment of the present invention a National Semiconductor LM311 Voltage Comparator is used to perform the stylus switch decoder functions. The use and application of such a voltage comparator as in the present invention is known in the art and is described in the *National Semiconductor Linear Data Book,* which is hereby incorporated by reference.

Calibration analog switch 38 is used to select a known input 128 to digital gain control 40. Sine wave signal 124 from power amplifier 34 and analog signal 30 from stylus 2 are the two input sources from which calibration analog switch 38 selects input 128 for digital gain control 40. During normal operation, calibration analog switch 38 transmits the stylus analog signal 30 to digital gain control 40. During the calibration of digital gain control 40, calibration analog switch 38 transmits the signal from power amplifier 34, serving as a reference signal, to digital gain control 40. Use of the calibration switch 38 results in a known relationship between each of the sixteen (16) gain settings. Calibration analog switch 38 in the preferred embodiment of the present invention is an HI201HS High Speed Quad SPST CMOS Analog Switch. The use an application of such an analog switch is known in the art and described in the *Harris Corporation Analog and Telecommunications Product Data Book,* which is hereby incorporated by reference.

The output from calibration analog switch 38 provides the reference signal input for digital gain control 40 as described above. Digital gain control 40 adjusts the amplitude of stylus signal 128 based on the four (4) bit gain setting information simultaneously received from microprocessor 110 via microprocessor ports 108. Four (4) bit gain setting signal 162 from microprocessor 110 determines the gain used by digital gain control 40. Since the relative gains are known to a high degree of precision the relative gain for each drive direction can be factored out. In the preferred embodiment the gain ranges from 1 to 16. Digital gain control 40 serves to maximize the available range of analog to digital converter 104.

Microprocessor 110 is able to independently vary the gain setting for each drive direction of conductive surface 6. Microprocessor 110 independently controls the gain setting for each drive direction by using four analog switches to four (4) different resistors as dictated by software controlling microprocessor 110. Controlling the gain independently for each drive direction the system uses the narrowest possible pass band. Since the pass band is proportional to the rejection of stochastic noise, narrowing the pass band permits maximizing the rejection of noise. In the preferred embodiment, an HI201 Quad SPST CMOS Analog Switch is used to preform the switching used in the digital gain control function. The use and application of such an analog switch as in the present invention is known in the art and described in the *Harris Corporation Analog and Telecommunications Product Data Book*, referenced above.

Referring to FIG. 2, the sinusoidal waveform output 126 from sine wave generator 36 provides a highly consistent amplitude waveform. The consistency and precision of sinusoidal waveform output 126 with the addition of controlled gain, provides a high signal to noise ratio. Band pass filter 42 is used to further improve the signal to noise ratio, and thereby improve the precision of the system. Band pass filter 42 narrow the bandwidth of the signal which rejects the noise on the signal.

In the preferred embodiment, band pass filter 42 accepts signals whose spectrum occupies a very narrow band range in the vicinity of 250 kHz (i.e., approximately the frequency of sinusoidal waveform output 126) and attenuates any other signals. Band pass filter 42 input is designed to set the pass band approximately equal to the frequency of sinusoidal waveform output 126. This frequency selective network allows only specified frequency signals 132 to pass, and all components having frequencies outside of the pass band are attenuated.

In the preferred embodiment, band pass filter 42 is a 2-pole, fourth order Butterworth filter, comprised of an LM318 Operational Amplifier and a connected resistive/capacitive network. The use of operational amplifier resistors and capacitor to build band pass filters such as band pass filter 42 is known in the art and described, for example, to the *National Semiconductor Linear Data Book*, referenced above.

Variable timing generator (VTG) 14 in FIG. 1 consists of state machine 114 and control signal driver 112. State machine 114 contains a high frequency oscillator, 16-bit binary counter, and decoder logic which decodes the output signals of the binary counter (all not explicitly shown). The frequency of the oscillator is sufficiently high (e.g. 20 Mhz) to insure that the alternating field generated by the surface can be measured easily by the capacitively coupled stylus 2. All components in the variable timing generator are commercially available parts, and they are interconnected in a conventional manner. The decoder logic can be constructed of look-up table PROM's, PAL's or sequential logic ,components.

The system of the present invention has been designed to control offsets. Controlling offsets improves the accuracy of the system signal and hence a more accurate signal produces a more accurate result from the integrator. Several controllable offsets are listed with the corresponding the effect on the system signal and the hardware which has been designed for quantifying these offsets, coupling and unwanted effects.

1. Referring to FIG. 10 at point 203, offset due to the difference between the ADC zero scale voltage and the integrator reset voltage which has a constant effect on the system signal. This offset is quantified using calibration analog switch 38 shown in FIG. 2.
2. Hold step and droop rate which is directly associated with the sample and hold amplifier. Occurring at point 218 on FIG. 10, this offset has a constant effect on the integrator signal and is very similar to #1 above. Effects #1 and #2 are not readily distinguishable, however, since neither is a function of time. If the sum of effects #1 and #2 can be calculated, then these signals can be subtracted from the integrator signal. This offset is quantified by varying digital gain control 40 using signal 124.
3. Integrator input offset which occurs during integration or reset and has a time dependent effect on the system signal. This offset is quantified using rectifier output switch 46 controlled by signal 138.
4. Half wave rectifier output offset which occurs during the integration of the input signal. This offset has a time dependent effect on the system signal.
5. Half wave rectifier input offset which occurs during the integration of the input signal. This offset has a time dependent effect on the system signal. This offset is quantified by shutting off the overlay using signal 48 via 112.
6. Unwanted coupling from power amp 34 to ASP 28 elements. This coupling is always present when driving the overlay and has a time dependent effect on the system. Coupling is controlled by varying the integration time.
7. Offset in gains throughout the system which is amplitude dependent.
8. Band pass at the band pass filter. If the pass band is too narrow the amplitude during the previous drive direction will effect the present integration cycle.

Integrator 102 measures the area between the half-wave rectified, filtered signal 158 and ground potential. Output signal 155 of integrator 102 varies proportionally to the area between the signal and ground. In the preferred embodiment of the present invention, integrator 102 is an AD585 High Speed Precision Sample-and-Hold Amplifier. The use and application of such a sample-and-hold amplifier is known in the art and denoted in the Analog Devices AD585 Data Sheet, which is hereby incorporated by reference. Since the integrator is a sample and hold amp and functions as such, it thus eliminates the need for a sample and hold amplifier between the integrator and the ADC. If the ADC used were too slow, adding a sample hold amp would allow simultaneous integration and analog to digital conversion for compensation.

Rectifier output switch 46 connects and disconnects half-wave rectifier 44 and integrator 102. Rectifier output switch 46 has two control inputs, one input 136 from state machine 114, and another input 138 from microprocessor 110 via microprocessor ports 108. Rectifier output switch 46 is turned on only when both controls are active. When state machine 114 is resetting integrator 102, state machine 114 turns rectifier output switch 46 off. When microprocessor 110 is measuring the DC offset of half-wave rectifier 46 and integrator 102 for a specific integration time, microprocessor 110 turns rectifier output switch 46 off.

In an alternative embodiment the integration time can be uniquely variable for each drive direction. If the amplitude of signal 158 coming into integrator 102 is approximately equal for each of the four drive directions, through digital gain control, only selection of the length of a common integration time for each drive direction is required. Further, microprocessor 110 is able to maintain minimum changes in the amplitude of signal 130 into band pass filter 42 by controlling the gain uniquely for each drive direction. Since the width of the pass band is inversely proportional to the time for the signal to decay, and the step size is proportional to the time for the signal to decay, the closer the input signal gain is to the band pass filter, less signal decay time is needed. By minimizing the time for the signal to decay the number of samples can be maximized which in turn allows the present invention to sense the location of stylus 2 more often, thereby increasing accuracy while maintaining precision.

Analog to digital converter (ADC) 104 converts analog signal 155 to equivalent digital data output 167. ADC 104 of the preferred embodiment of the present invention is a Philips TDA1534 14-bit Analog to Digital Converter, Use and application of such an ADC is known in the art and is described in the *Signetics Linear Data Manual Vol. 2 Industrial,* which is hereby incorporated by reference. ADC 104 receives a timing control signal 168 from state machine 114. Timing control signal 168 is synchronized with integrator 102 control signal 160 such that when integrator 102 receives a signal 160 to stop integrating, ADC 104 receives a signal 168 to convert analog signal 155 to digital data for processing by microprocessor 110. Digital output 167 from ADC 104 is routed to microprocessor 110 by microprocessor ports 108 via microprocessor bus 150. Digital output 167 from ADC 104 provides microprocessor 110 with coordinate information, while 2-bits of encoded drive information 142 specifies to microprocessor 110 which direction of conductive surface 6 was driven when the information was gathered.

Microprocessor 110 functions to coordinate and control the elements of the present invention. In the preferred embodiment, microprocessor 110 is an Intel 80186. The use and application of microprocessors such as microprocessor 110 of the present invention is known in the art and is described in, for example, the Intel APX 86/88, 186/188 Users's Manual (Hardware Reference and Programmer's Reference) and Intel Microsystem Components Handbook Microprocessor Volume I, which are hereby incorporated by reference.

If microprocessor 110 has sufficient time to perform calculations to maintain small amplitude changes in output signal 130 of digital gain control 40, via 4-bit gain control setting 162, the bandwidth of the pass band of band pass filter 42 can be reduced. This increases the performance of the present invention since minimizing the width of the pass band by band pass filter 42, given that the frequency spectral content of noise in the system is essentially limited to the pass band, thus allows the relative 20 amount of noise imposed on the system to be reduced. This filtering process removes noise picked up along the umbilical of stylus 2 without reducing the data content of the signal transmitted from stylus 2.

In alternative embodiments of the present invention, hardware is included that maintains small amplitude changes at a given output. Such hardware (not explicitly shown) would be comprised of digital logic using multipliers and essentially perform the functions of what is known in the art as an arithmetic logic unit (ALU) (not shown). This specialized ALU would be able to maintain the gains, keep track of times of integration, and output data from the analog to digital converter (ADC). Using the timing and output data, the gain for small amplitude changes could be determined. The advantage of such hardware is to free microprocessor 110 to dedicate all available time to other processing functions.

While the present invention has been described largely in terms of a planar and rectilinear coordinate system, it would be apparent to one skilled in the art that other conductor shapes and coordinate systems may be employed without departing from the spirit of the present invention. For example, portions of spheres or cylinders may be employed rather than a flat plane. In addition, while typical uses of this improved high precision coordinate sensing method and apparatus require active areas of several square feet, the present invention can be successfully employed with very large sensors spanning tens of square feet. For such large sensors, the maximum stylus distance from the conductive surface is greater than several feet. Additionally, many small overlays working in concert to emulate a single large overlay, each having the accuracy and precision of a single large overlay, can be used to multiply the precision and accuracy of the system.

Further, while the present invention has been described largely as a coordinate sensing device which is used in conjunction with a single display device, it would be apparent to one skilled in the art that this invention can be used to control several display devices by allocating a specific control area to each of the control devices used. Such an allocation of control area is presented in copending application, U.S. patent application Ser. No. 914,924 (the "924 Patent"), filed Oct. 3, 1986 by Jakobs, et al., for "A Integrated Multi-display Overlay-Controlled Communicating Workstation", which is hereby incorporated by reference. Additionally, the allocation of designated control areas of conductive surface 6 can be implemented for use with non-planar non-rectilinear surfaces as described above.

Another alternative embodiment of the present invention utilizes a single stylus 2 over n-tuple conductive surfaces (multiple conductive surfaces such as conductive surface 6). For example, one or more surfaces act as a control area for the system while the remaining surfaces are mounted on display devices. The n-tuple displays working in concert are advantageous in that one stylus controls all of the displays and the system is highly functionally integrated with the system. Use of a single stylus over n-tuple conductive surfaces is described in the '231 Patent.

Although the invention has been described in terms of a preferred embodiment, and various alternative embodiments, it will be obvious to those skilled in the art that many alterations and modifications may be made without departing from the invention. Accordingly, it is intended that all such alterations and modifications be included within the spirit and scope of the invention as defined by the appended claims.

What is claimed is:

1. An apparatus for determining the spatial position of a probe with respect to a conductive surface, comprising:

drive means connected to the conductive surface for providing alternating electrical current to the conductive surface in predetermined directions and at predetermined intervals of time;

amplifier means connected to the probe for amplifying alternating electrical signals produced on the probe when the probe is brought into proximity of the conductive surface;

rectifying means connected to the amplifier means for controllably rectifying the amplified alternating electrical signals output from the amplifier means, wherein the rectifying means during periodic intervals does not provide rectification of the alternating electrical signals;

integrating means for periodically integrating the rectified electrical signals output from the rectifying means and for producing output signals in response to the rectified electrical signals, wherein the integrating means is reset during intervals in which the integrating means is not integrating the rectified electrical signals output from the rectifying means;

analog-to-digital converter means for producing digital signals in response to the output signals of the integrating means to a digital signal;

processing means connected to the analog-to-digital converter means for calculating the spatial position of the probe with respect to the conductive surface based on the digital signals produced by the analog-to-digital converter means; and control means for generating control signals for controlling the drive means, rectifying means, integrating means and processing means, wherein the integrating means is reset in a periodic interval during which the rectifying means is not providing rectification of the alternating electrical signals output from the amplifier means.

2. The apparatus of claim 1, wherein the conductive surface includes first, second, third, and fourth regions, and wherein the driving means comprises:

reference means for establishing a reference potential at one or more of the first, second, third, and fourth regions of the conductive surface at predetermined intervals of time; and signal application means for applying alternating electrical current at one or more of the first, second, third, or fourth regions of the conductive surface at predetermined intervals of time; wherein, the analog-to-digital converter means produces a first digital signal in response to the reference means establishing the first region to the reference potential and the signal application means applying alternating electrical current to the second region, produces a second digital signal in response to the reference means establishing the second region to the reference potential and the signal application means applying alternating electrical current to the first region, produces a third digital signal in response to the reference means establishing the third region to the reference potential and the signal application means applying alternating electrical current to the fourth region, and produces a fourth digital signal in response to the reference means establishing the fourth region to the reference potential and the signal application means applying alternating electrical current to the third region, wherein the processing means calculates the spatial position of the probe with respect to the conductive surface based on the first, second, third, and fourth digital signals produced by the analog-to-digital converter means.

3. The apparatus of claim 2, wherein the spatial position of the probe with respect to the conductive surface is defined by at least first and second coordinates, wherein the processing means calculates the first coordinate in response to two of the first, second, third, and fourth digital signals and calculates the second coordinate in response to the other two of the first, second, third, and fourth digital signals.

4. The apparatus as claimed in claim 1, wherein the control means inhibits the output signals of the rectifying means from being produced when the integrating means is being reset.

5. The apparatus as claimed in claim 1, wherein the control means activates the integrating means following reset in a periodic interval during which the rectifying means is not providing rectification of the alternating electrical signals output from the amplifier means.

6. The apparatus as claimed in claim 1, wherein the alternating electrical current provided by the drive means to the conductive surface is sinusoidal.

7. The apparatus as claimed in claim 6 further comprising band pass filter means coupled between the amplifier means and the rectifier means for filtering signals of a frequency higher than the predetermined frequency of the sine wave of the alternating electrical current provided by the drive means.

8. The apparatus as claimed in claim 1 further comprising signal synchronization means for synchronizing the control signals generated by the control means with the alternating electrical current provided by the drive means.

9. The apparatus as claimed in claim 8, wherein the processing means comprises a processing unit and a processor clock for generating clock signals for operating the processing unit, wherein the synchronizing means further synchronizes the clock signals generated by the processor clock with alternating electrical current provided by the drive means.

10. The apparatus as claimed in claim 8, wherein the synchronizing means comprises a phase locked loop.

11. A method for determining the spatial position of a probe with respect to a conductive surface, comprising the steps of:

providing alternating electrical current to the conductive surface in predetermined directions and at predetermined intervals of time;

detecting alternating electrical signals produced on the probe when the probe is brought into proximity of the conductive surface;

rectifying the detected alternating electrical signals produced on the probe to produce rectified electrical signals, wherein the rectifying step is not performed during periodic intervals;

periodically integrating the rectified electrical signals with an integrator and producing integrated output signals in response to the rectified electrical signals;

resetting the integrator during intervals in which the rectifying step is not performed;

producing digital signals in response to the integrated output signals; and calculating the spatial position of the probe with respect to the conductive surface in response to the digital signals.

12. The method of claim 11, wherein the step of detecting alternating electrical signals produced on the probe when the probe is brought into proximity of the conductive surface includes amplification of the detected alternating electrical signals.

13. The method of claim 11, wherein the conductive surface includes first, second, third, and fourth regions, wherein the step of providing alternating electrical current to the conductive surface comprises the steps of:

establishing a reference potential at one or more of the first, second, third, and fourth regions of the conductive surface at predetermined intervals of time; and applying alternating electrical current at one or more of the first, second, third or fourth regions of the conductive sheet at predetermined intervals of time; wherein, a first digital signal is produced in response to the establishing of the first region to the reference potential and the applying of alternating electrical current to the second region, a second digital signal is produced in response to the establishing of the second region to the reference potential and the applying of alternating electrical current to the first region, a third digital signal is produced in response to the establishing of the third region to the reference potential and the applying of alternating electrical current to the fourth region, and a fourth digital signal is produced in response to the establishing of the fourth region to a reference potential and the applying of alternating electrical current to the third region, wherein spatial position of the probe with respect to the conductive surface is calculated based on the first, second, third, and fourth digital signals.

14. The method of claim 13, wherein the spatial position of the probe with respect to the conductive surface is defined by at least first and second coordinates, wherein the first coordinate is calculated in response to two of the first, second, third, and fourth digital signals and the second coordinate is calculated in response to the other two of the first, second, third, and fourth digital signals.

15. A method for determining the spatial position of an object with respect to a surface, comprising the steps of:

producing alternating electrical signals in response to the object being brought into proximity of the surface, wherein the magnitude of the produced alternating electrical signals are dependent upon the location of the object with respect to the surface;

rectifying the produced alternating electrical signals to produce rectified electrical signals, wherein the rectifying step is not performed during periodic intervals;

periodically integrating the rectified electrical signals with an integrator and producing integrated output signals in response to the rectified electrical signals;

resetting the integrator during intervals in which the rectifying step is not performed;

producing digital signals in response to the integrated output signals; and calculating the spatial position of the object with respect to the surface in response to the digital signals.

16. In an apparatus for determining the spatial position of a probe with respect to a conductive surface, an improved handheld probe for use by an operator of the apparatus, comprising:

a housing having a forward end and rear end, wherein the housing is of an elongated cylindrical shape having contoured portions on the exterior surface thereof at a predetermined distance from the forward end of the housing for the placement of the fingers of the operator, wherein the fingers of the operator are maintained at a second predetermined distance from the forward end of the housing;

signal sensing means for sensing electrical signals produced by the conductive surface, wherein the signal sensing means is flexibly secured inside the housing and has an exposed portion near the forward end of the housing;

output means for generating an output signal derived from the electrical signals sensed by the signal sensing means; and switch means connected to the signal sensing means for generating a control signal in response to the signal sensing means making physical contact with the conductive surface, wherein the switch means comprises a zero travel switch, wherein the zero travel switch requires minimum physical movement for the activation of the switch means.

17. The apparatus of claim 16, wherein the output signal generated by the output means is an alternating voltage signal, wherein the control signal generated by the switch means is a voltage level, wherein the voltage level generated by the switch means is added to the alternating voltage signal generated by the output means.

18. In an apparatus for determining the spatial position of a probe with respect to a conductive surface, an improved handheld probe for use by an operator of the apparatus, comprising:

a housing having a forward end and rear end, wherein the housing is of an elongated cylindrical shape having contoured portions on the exterior surface thereof at a predetermined distance from the forward end of the housing for the placement of the fingers of the operator, wherein the fingers of the operator are maintained at a second predetermined distance from the forward end of the housing;

signal sensing means for sensing electrical signals produced by the conductive surface, wherein the signal sensing means is flexibly secured inside the housing and has an exposed portion near the forward end of the housing;

output means for generating an output signal derived from the electrical signals sensed by the signal sensing means; and switch means connected to the signal sensing means for generating a control signal in response to the signal sensing means making physical contact with the conductive surface, wherein the output signal generated by the output means is an alternating voltage signal, wherein the control signal generated by the switch means is a voltage level, wherein the voltage level generated by the switch means is added to the alternating voltage signal generated by the output means.

19. In an apparatus for determining the spatial position of a probe with respect to a conductive surface, an improved handheld probe for use by an operator of the apparatus, comprising:
a housing having a forward end and rear end, wherein the housing is of an elongated cylindrical shape;
signal sensing means for sensing electrical signals produced by the conductive surface, wherein the signal sensing means is flexibly secured inside the housing and has an exposed portion near the forward end of the housing;
output means for generating an output signal derived from the electrical signals sensed by the signal sensing means, wherein the output means comprises an operational amplifier configured as a current sensing element; and
switch means connected to the signal sensing means for generating a control signal in response to the signal sensing means making physical contact with the conductive surface, wherein the switch means comprises a zero travel switch, wherein the zero travel switch requires minimum physical movement for the activation of the switch means.

20. The apparatus of claim 19 wherein the output signal generated by the output means is an alternating voltage signal, wherein the control signal generated by the switch means is a voltage level, wherein the voltage level generated by the switch means is added to the alternating voltage signal generated by the output means.

21. In an apparatus for determining the spatial position of a probe with respect to a conductive surface, an improved handheld probe for use by an operator of the apparatus, comprising:
a housing having a forward end and rear end, wherein the housing is of an elongated cylindrical shape;
signal sensing means for sensing electrical signals produced by the conductive surface, wherein the signal sensing means is flexibly secured inside the housing and has an exposed portion near the forward end of the housing;
output means for generating an output signal derived from the electrical signals sensed by the signal sensing means, wherein the output means comprises an operational amplifier configured as a current sensing element; and
switch means connected to the signal sensing means for generating a control signal in response to the signal sensing means making physical contact with the conductive surface;
wherein the output signal generated by the output means is an alternating voltage signal, wherein the control signal generated by the switch means is a voltage level, wherein the voltage level generated by the switch means is added to the alternating voltage signal generated by the output means.

22. In an apparatus for determining the spatial position of a probe with respect to a conductive surface, an improved handheld probe for use by an operator of the apparatus, comprising:
a housing having a forward end and rear end, wherein the housing is of an elongated cylindrical shape;
signal sensing means for sensing electrical signals produced by the conductive surface, wherein the signal sensing means is flexibly secured inside the housing and has an exposed portion near the forward end of the housing;
output means for generating an output signal derived from the electrical signals sensed by the signal sensing means; and
switch means connected to the signal sensing means for generating a control signal in response to the signal sensing means making physical contact with the conductive surface, wherein the switch means comprises a zero travel switch, wherein the zero travel switch requires minimum physical movement for the activation of the switch means.

23. The apparatus of claim 22 wherein the output signal generated by the output means is an alternating voltage signal, wherein the control signal generated by the switch means is a voltage level, wherein the voltage level generated by the switch means is added to the alternating voltage signal generated by the output means.

24. In an apparatus for determining the spatial position of a probe with respect to a conductive surface, an improved handheld probe for use by an operator of the apparatus, comprising:
a housing having a forward end and rear end, wherein the housing is of an elongated cylindrical shape;
signal sensing means for sensing electrical signals produced by the conductive surface, wherein the signal sensing means is flexibly secured inside the housing and has an exposed portion near the forward end of the housing;
output means for generating an output signal derived from the electrical signals sensed by the signal sensing means; and
switch means connected to the signal sensing means for generating a control signal in response to the signal sensing means making physical contact with the conductive surface;
wherein the output signal generated by the output means is an alternating voltage signal, wherein the control signal generated by the switch means is a voltage level, wherein the voltage level generated by the switch means is added to the alternating voltage signal generated by the output means.

* * * * *